(12) United States Patent
Suresh

(10) Patent No.: US 9,031,592 B2
(45) Date of Patent: May 12, 2015

(54) METHOD AND SYSTEM FOR CANCELLING ADJACENT CELLS INTERFERENCE SIGNAL IN A WIRELESS COMMUNICATION SYSTEM

(71) Applicant: Tejas Networks Limited, Bangalore, Karnataka (IN)

(72) Inventor: Sriram N. Suresh, Tamilnadu (IN)

(73) Assignee: Tejas Networks Limited, Bangalore, Karnataka (IN)

( * ) Notice: Subject to any disclaimer, the term of this patent is extended or adjusted under 35 U.S.C. 154(b) by 182 days.

(21) Appl. No.: 13/853,965

(22) Filed: Mar. 29, 2013

(65) Prior Publication Data
US 2013/0260807 A1    Oct. 3, 2013

(30) Foreign Application Priority Data
Mar. 31, 2012   (IN) .......................... 1286/CHE/2012

(51) Int. Cl.
| | |
|---|---|
| H04B 7/00 | (2006.01) |
| H04W 24/02 | (2009.01) |
| H04W 72/08 | (2009.01) |
| H04B 1/10 | (2006.01) |
| H04L 1/00 | (2006.01) |
| H04L 25/02 | (2006.01) |
| H04L 5/00 | (2006.01) |
| H04W 88/08 | (2009.01) |
| H04W 92/20 | (2009.01) |

(52) U.S. Cl.
CPC ............ H04W 24/02 (2013.01); H04W 72/082 (2013.01); H04B 1/10 (2013.01); H04L 1/00 (2013.01); H04W 88/08 (2013.01); H04W 92/20 (2013.01); H04L 25/0224 (2013.01); H04L 5/0073 (2013.01)

(58) Field of Classification Search
CPC ....................................................... H04W 24/02
USPC ........... 455/501, 438, 442, 63.1, 404.1, 404.2
See application file for complete search history.

(56) References Cited

U.S. PATENT DOCUMENTS

| | | | |
|---|---|---|---|
| 2007/0060059 A1* | 3/2007 | Kim et al. ..................... | 455/63.1 |
| 2008/0254804 A1* | 10/2008 | Lohr et al. ..................... | 455/442 |
| 2010/0279695 A1* | 11/2010 | Amirijoo et al. .............. | 455/438 |
| 2014/0192759 A1* | 7/2014 | Son et al. ....................... | 370/329 |

* cited by examiner

Primary Examiner — Sanh Phu
(74) Attorney, Agent, or Firm — Merchant & Gould P.C.

(57) ABSTRACT

The present invention relates to a method for cancelling adjacent cells interference signal in a wireless communication system. In one embodiment this is accomplished by receiving desired user signal and cancel the channel effect using the desired users reference and or pilot signals, by a serving base station, identifying interference power by estimating the interferer power, determining if the interference is more than threshold, monitoring the interference and identify the interferer signal, re-generating the interference signal source and perform the channel estimate for the interferer, and canceling the interference by applying the interference pattern and the channel estimate to the desired user who's interference is more than threshold.

6 Claims, 3 Drawing Sheets

METHOD AND SYSTEM FOR CANCELLING ADJACENT CELLS INTERFERENCE SIGNAL IN A WIRELESS COMMUNICATION SYSTEM

This application claims benefit of Serial No. 1286/CHE/2012, filed 31 Mar. 2012 in India and which application is incorporated herein by reference. To the extent appropriate, a claim of priority is made to the above disclosed application.

FIELD OF THE INVENTION

The invention relates to wireless communication networks. More particularly, the present invention relates to a method and system for cancelling adjacent cells interference signal in one or more wireless communication networks.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from one or more neighbor base stations. On the uplink, a transmission from the UE may cause interference to transmissions from one or more other UEs communicating with the one or more neighbor base stations. The interference may degrade performance on both the downlink and uplink. If two or more UE's located in two and/or more cell's overlapping region, the UE's connected to different cells interfere each other. This interference is caused due to one or more UE's using same radio resources causes' interference in the uplink.

Typically, in a wireless communication system, a UE or mobile station is enabled to communicate with an access or base station of a wireless communication network by means of a connection via a radio interface. The radio resources, which are available for a particular wireless communication system, can be used in different simultaneous connections without interference by splitting the radio resources up into different channels which leads to low performance, low throughput and also reduces the SNR and/or SNR in the link. Thus there exist a method and system for cancelling adjacent cells interference signal in a wireless communication system.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one aspect of the present invention is a method for cancelling adjacent cells interference signal in a wireless communication system, the method comprising: receiving desired user signal and cancel the channel effect using the desired users reference and or pilot signals, by a serving base station, identifying interference power by estimating the interferer power, wherein the interferer's power is identified by nullifying the desired user transmission, determining if the interference is more than threshold, monitoring the interference and identify the interferer signal, wherein identifying the interferer based on the reference and or pilot signal transmitted by the interferer, re-generating the interference signal source and perform the channel estimate for the interferer, wherein channel estimation is determined by difference between transmitted signal and received signal and canceling the interference by applying the interference pattern and the channel estimate to the desired user whose interference is more than threshold.

In accordance with another aspect of the present invention is an enode B, comprising: a memory, a processor communicatively coupled to the memory and a control circuit communicatively coupled to the memory and the processor, wherein the control circuit is configured for cancelling adjacent cells interference signal in a wireless communication system, receiving desired user signal and cancel the channel effect using the desired users reference and or pilot signals, by a serving base station, identifying interference power by estimating the interferer power, wherein the interferer's power is identified by nullifying the desired user transmission, determining if the interference is more than threshold, monitoring the interference and identify the interferer signal, wherein identifying the interferer based on the reference and or pilot signal transmitted by the interferer, re-generating the interference signal source and perform the channel estimate for the interferer, wherein channel estimation is determined by difference between transmitted signal and received signal and canceling the interference by applying the interference pattern and the channel estimate to the desired user whose interference is more than threshold.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the detailed description of the invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

Figure 1:
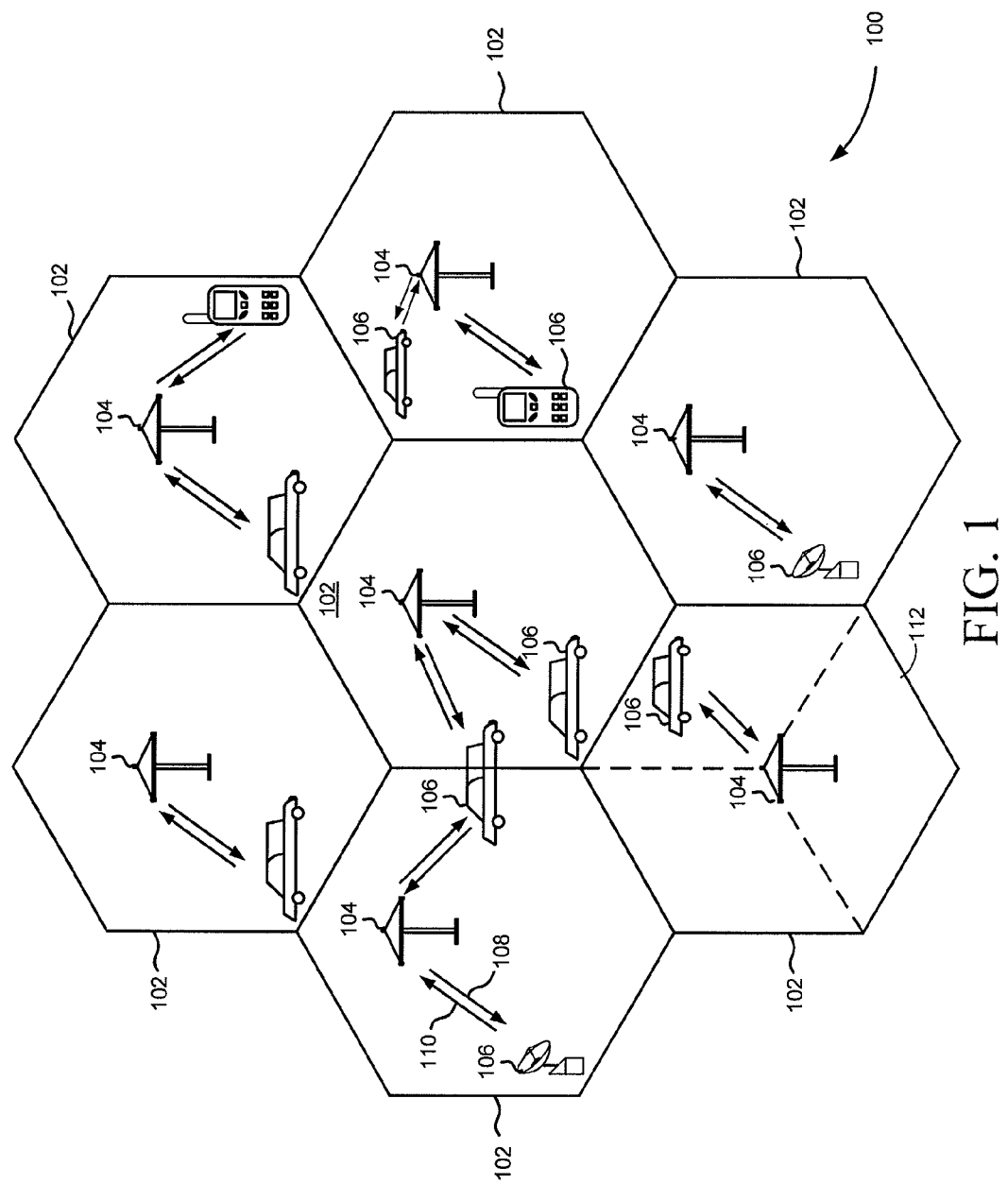
FIG. 1 illustrates an example wireless communication system, in accordance with certain embodiments of the present disclosure.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

FIG. 1 illustrates an example of a wireless communication system 100. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
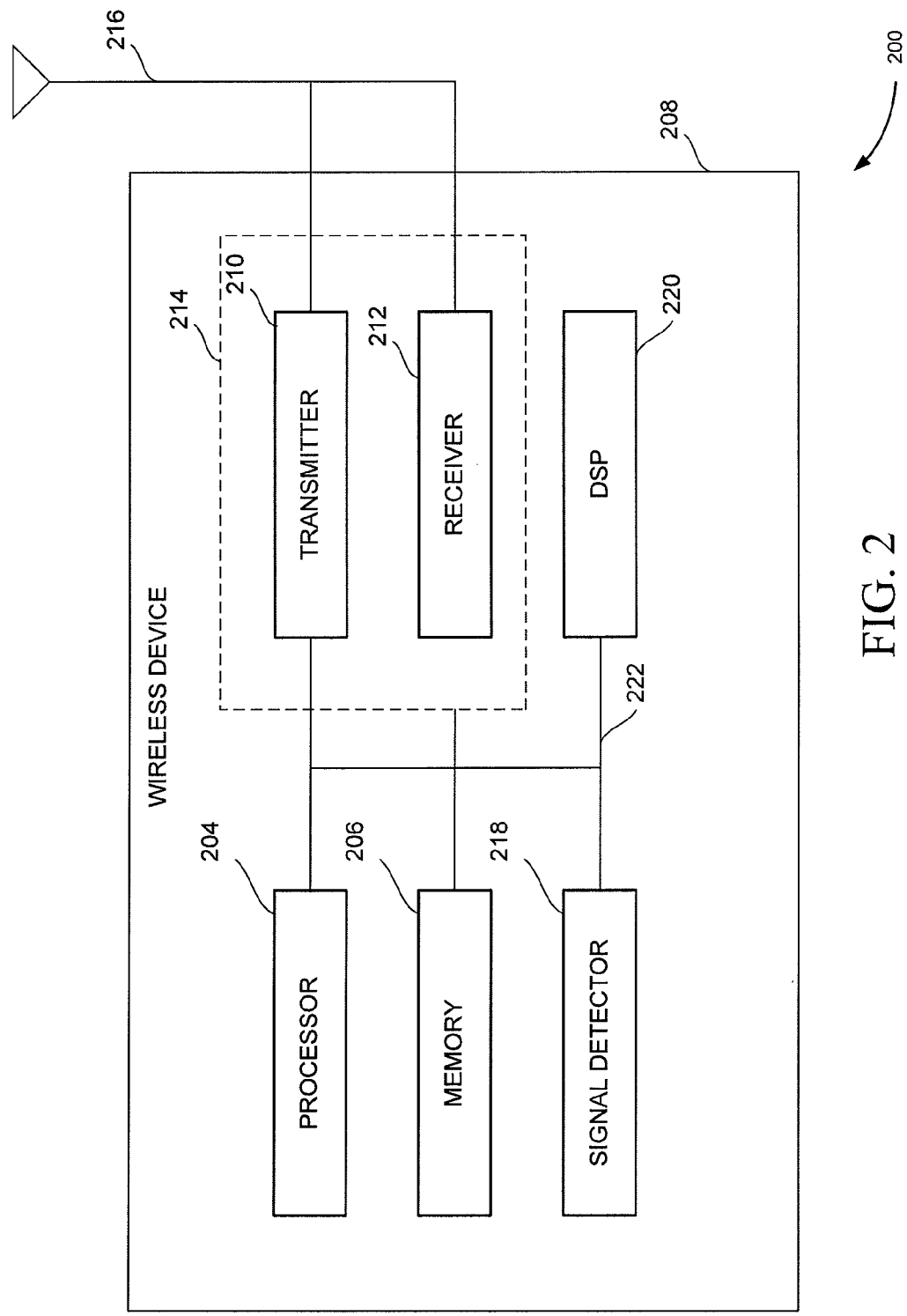
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudo noise (PN) chips, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
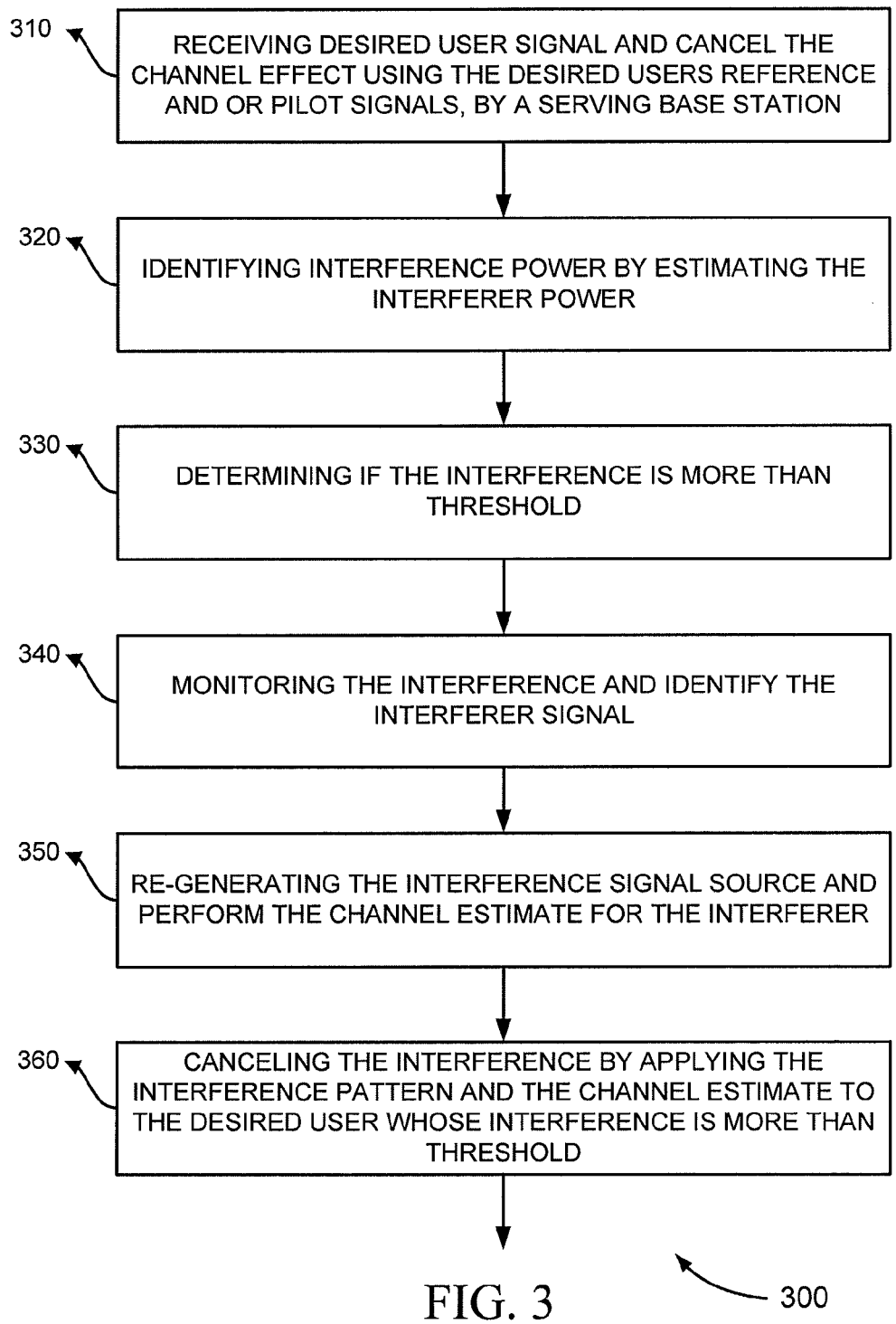
FIG. 3 shows a flow chart of a method for cancelling adjacent cells interference signal in a wireless communication system according to one embodiment of the present invention.

FIG. 3 shows a flow chart of a method for cancelling adjacent cells interference signal in a wireless communication system according to one embodiment of the present invention.

At step 310, the method receives desired user signal and cancel the channel effect using the desired users reference and or pilot signals, by a serving base station. The serving base station is an eNodeB.

At step 320, the method identifies interference power by estimating the interferer power, where the interferer's power is identified by nullifying the desired user transmission.

At step 330, the method determines if the interference is more than threshold. The threshold is determined in which the required Bit Error Rate (BER) requirement for the wireless system is met.

At step 340, the method monitors the interference and identify the interferer signal, where identifying the interferer based on the reference and or pilot signal transmitted by the interferer. The interferers are identified through User Equipment interference report and or through X2 interface and or any other means to exchange the report.

At step 350, the method re-generates the interference signal source and performs the channel estimation for the interferer or using the channel estimates of the desired user. The channel estimation is determined by difference between transmitted signal and received signal. The re-generated source is the transmitted signal and the interference signal received in the base station is the received signal.

At step 360, the method cancels the interference by applying the interference pattern and the channel estimate to the desired user whose interference is more than threshold. This step continues till the number of interferer's interference gets cancelled. The method for interference cancellation and/or increase the throughput in interfering region in a heterogeneous network by detecting interfering sectors and/or cells reference signals to perform interference cancellation at base station reception.

In an example embodiment, for sector to sector interference cancellation is given below:

Consider x(t) is the transmitted signal carries the user data which is encoded, modulated and MIMO processed at the base station and will be sent over air along with Cell specific reference signals.

Consider the received signal y(t) is received at the receiving antenna and will be stored in the buffer for further processing.

This received signal may contain the interference from neighboring cells and is given below $y(t)=h^x(t)+I_0(t)+I_1(t)+ \ldots +I_{N-1}(t)$, where $I_n=h_n^x_n$ The incoming samples to the receiving antenna will be collected in the AIF2 Ping-Pong Buffer of DDR through CPRI interface. Upon receiving the 30720 samples in the 1 msec duration, the method reads the samples from DDR to DSP memory. The samples stored in the DSP memory will undergo the OFDM receive processing. The method gets the cell configuration of the neighboring Base stations through X2AP which includes physical layer cell ID, sub frame number etc. Further, the method generates the Cell Specific reference signals of the neighboring base stations using the configurations received through X2AP.

Estimate the Interference signal from the received signal, $\hat{I}(\hat{K})=Y(K) \times X_n(K)^*$ Calculate the interference power, $P_n=\log(\Sigma |\hat{I}(\hat{t})|^2/_N)$ Subtract the Interference signal along with scaling factor $S_n$ which is derived from the $P_n$ power from the received signal, $Z(K)=Y(K)-\Sigma S_n^* \hat{I}(\hat{K})$ By doing the Estimation and equalization for the Interference Cancelled signal Z(K) and the Receive processing in order to decode the packet. This improves the performance of the system as multi sector interference is been eliminated.

The proposed method monitors, measure and cancels the interference caused by the other User Equipments and or Interference caused by other sectors of serving base station by making use of all the radio resources available for all the users. The proposed method provides the performance of more throughputs in the interfering region and also increases SNR and/or SINR in the link.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module (i.e., the code, instructions, etc.) may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction or code, or many instructions or strings/sets of code, and may be distributed over several different code segments or instruction sets, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules or steps or unit or other appropriate means for performing the methods and techniques described herein, such as those illustrated by FIG. 1 can be downloaded and/or otherwise obtained by a user terminal and/or base station as applicable. For example, such a device can be coupled to a server to facilitate the transfer of means for performing the methods described herein. Alternatively, various methods described herein can be provided via a storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

I claim:

1. A method for cancelling adjacent cells' interference signal in a wireless communication system, the method comprising:
    serving the desired user's signal affected by the channel and interference at the base station of the desired user;
    cancelling channel effects using the desired user's reference and or pilot signals, by the said base station;
    identifying interference power by estimating the interferer power, wherein the interferer's power is identified by nullifying the desired user transmission;
    determining if the interference is more than threshold;
    monitoring the interference and identify the interferer signal, wherein identifying the interferer based on the reference and or pilot signal transmitted by the interferer;
    re-generating the interference signal source and perform the channel estimation for the interferer or using the channel estimates of the desired user, wherein channel estimation is determined by difference between transmitted signal and received signal; and
    canceling the interference by applying the interference pattern and the channel estimate to the desired user whose interference is more than threshold.

2. The method of claim 1, further comprising
    identifying the interferers through User Equipment interference report and or through X2 interface or any other means of exchanging the interference.

3. The method of claim 1, wherein the serving base station is an eNodeB.

4. The method of claim 1, wherein the threshold is determined in which the required Bit Error Rate (BER) requirement for the wireless system is met.

5. The method of claim 1, wherein the re-generated source is the transmitted signal and the interference signal received in the base station is the received signal.

6. An enode B, comprising:
    a memory;
    a processor communicatively coupled to the memory; and
    a control circuit communicatively coupled to the memory and the processor, wherein the control circuit is configured for cancelling adjacent cells interference signal in a wireless communication system,
        receiving desired user signal and cancel the channel effect using the desired users reference and or pilot signals, by a serving base station;
        identifying interference power by estimating the interferer power, wherein the interferer's power is identified by nullifying the desired user transmission;
        determining if the interference is more than threshold;

monitoring the interference and identify the interferer signal, wherein identifying the interferer based on the reference and or pilot signal transmitted by the interferer;

re-generating the interference signal source and perform the channel estimate for the interferer, wherein channel estimation is determined by difference between transmitted signal and received signal; and canceling the interference by applying the interference pattern and the channel estimate to the desired user whose interference is more than threshold.

* * * * *